Oct. 20, 1931.  J. S. RICHARDSON  1,827,763
TURNING MACHINE CHUCK
Filed June 17, 1926  2 Sheets-Sheet 1

WITNESSES  INVENTOR
Jairus S. Richardson
By R. S. Caldwell
ATTORNEY

Oct. 20, 1931.         J. S. RICHARDSON         1,827,763
                       TURNING MACHINE CHUCK
             Filed June 17, 1926        2 Sheets-Sheet 2
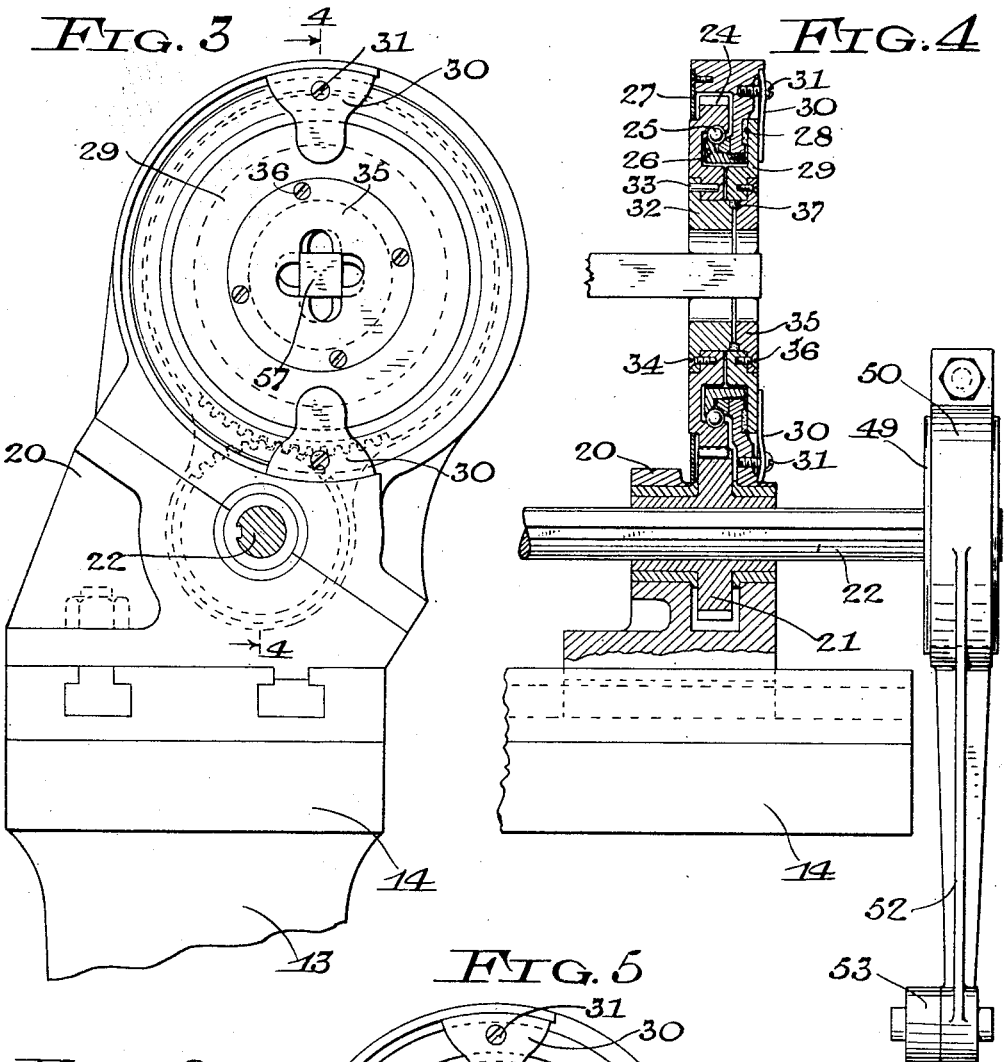
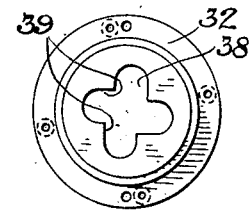

Patented Oct. 20, 1931

1,827,763

UNITED STATES PATENT OFFICE

JAIRUS S. RICHARDSON, OF SHEBOYGAN FALLS, WISCONSIN, ASSIGNOR, BY MESNE ASSIGNMENTS, TO MATTISON MACHINE WORKS, OF ROCKFORD, ILLINOIS, A CORPORATION OF ILLINOIS

TURNING MACHINE CHUCK

Application filed June 17, 1926. Serial No. 116,577.

The invention relates to work chucking means, more particularly for use with wood turning machines.

An object of the invention is to provide work chucking means including a pair of relatively rotatable chuck members which permit rapid chucking and releasing of the work.

Another object of the invention is to provide work chucking means by which the work can be supported and driven at a plurality of points, thereby permitting successful turning of long slender work pieces.

A further object of the invention is to provide work chucking means by which the work pieces may be rapidly and accurately centered, thereby permitting working to close limits and minimizing waste.

Another object is to provide a new and improved work centering device which is unusually thin, is adapted for use intermediate the ends of a work piece to prevent breaking of the work piece by the laterally applied force of the cutting tool, and which is easily applied to the work.

The invention further consists in the several features hereinafter set forth and more particularly defined by the annexed claims.

In the accompanying drawings, Fig. 1 is an end elevation of a wood turning machine embodying the chucking means of this invention;

Fig. 3 is an end view of one of the chucks, parts being broken away and parts being shown in section;

Fig. 4 is a detail sectional view taken on the line 4—4 of Fig. 3;

Fig. 5 is a fragmentary detail view similar to Fig. 3, but with the chuck in releasing position; and Fig. 6 is a detail axial view of the driving chuck member or die.

Figure 1:
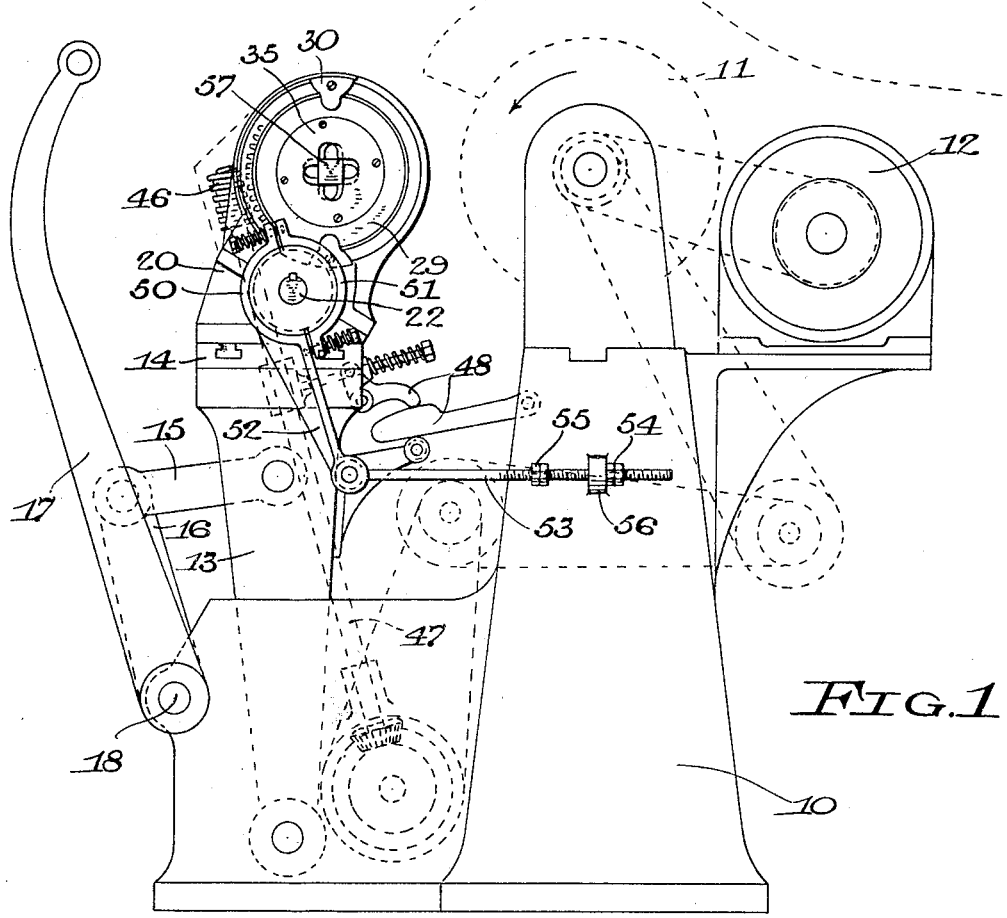

In these drawings 10 indicates a turning machine frame on which is rotatably mounted a cutter head 11 driven in any suitable manner, as by an electric motor 12. The cutter head is of usual construction including a plurality of sets of cutting knives, not shown.

An oscillatory work carriage 13 is pivotally mounted at its lower end on the frame 10 and is provided with the usual longitudinally slotted table 14 at its upper end. The work carriage is rocked towards and away from the cutter head 11 by the usual links 15, cranks 16 and hand lever 17, the cranks 16 and lever 17 being secured to a rock shaft 18.

The slotted table 14 of the work carriage 13 is equipped with a plurality of spaced aligned chucks 19 of this invention. Each chuck 19 comprises a housing or support 20, the lower part of which is slidably mounted on the slotted table 14 but capable of being clamped thereon at any desired point. A pinion 21 is journalled within the housing and has splined to it a driving shaft 22 extending longitudinally of the table and journalled at one end in a pedestal 23 secured to the table. The pinion 21 is meshed with a ring gear 24 formed from a centrally apertured disk and rotatably mounted within the narrow upper part of the housing 20 on an anti-friction bearing 25. In order to provide compactness, the bearing preferably extends into an annular channel 26 formed in one face of the gear. An annular dust-excluding ring 27 is secured to the housing to enclose the periphery of the ring gear at its outer side. The opposite side of the housing carries an annular facing 28 of friction material, such as cork, on which bears an annular friction or brake disk 29 urged thereagainst by resilient pressure plates 30 adjustably secured to the housing by screws 31. The inner periphery of the ring gear 24 is recessed to receive a flanged chuck member or die 32 concentric therewith and secured thereto by one or more dowels 33 and screws 34. The brake disk 29 is centered by engagement with the periphery of the chuck members 32 and is recessed to receive a flanged chuck member 35 secured thereto by screws 36. An annular packing ring 37 may be disposed between the inner faces of the chuck members 32 and 35 to exclude dust or other foreign material. The chuck member 32 is provided with a central aperture 38 having inwardly-projecting work-engaging faces or jaws 39 disposed at right angles to each other, in the case of square or rectangular work pieces. The faces or jaws 39 drivingly engage the faces of the work piece near the edges of the latter and also serve to center the work piece with respect to the axis of rotation of the chuck member. The chuck member 35 is provided with a central aperture 40 which is similar to that in the chuck member 32 but of opposite hand in order to present work-engaging faces or jaws 41 co-operating with adjacent work-engaging faces or jaws 39 of the chuck member 32 to engage the corners of the work piece in the manner shown in Figs. 1 and 3. In the case of work pieces of square cross-section, such as are usually provided, the central apertures in the chuck members may be of cruciform shape with the arms laterally offset to form the work-engaging faces. The chuck members are made readily detachable from their supporting annuli in order to permit replacement for accommodation of work pieces of different size.

The driving shaft 22 carries a pinion 42 at one end meshing with a gear 43 mounted on a stud shaft 44 journalled in the pedestal 23. The gear 43 has secured to it a worm wheel 45, which is rotated at low sped by a worm 46 carried on a shaft 47. By suitable cam and lever mechanism 48, of well known construction in the turning machine art, the worm is mounted to be swung into mesh with the worm wheel when the work carriage is rocked towards the cutter head, and released from driving engagement therefrom when the carriage is rocked to its backward position.

The other end of the driving shaft 22 carries a flanged brake drum 49 on which bears a spring-urged brake including brake shoes 50 and 51. The brake shoe 50 carries a depending arm 52 having a laterally-projecting rod 53 pivotally mounted at its lower end and provided with spaced adjustably mounted stops 54 nd 55 engageable with opposite sides of a fixed lug 56 through which the rod passes.

Figure 2:
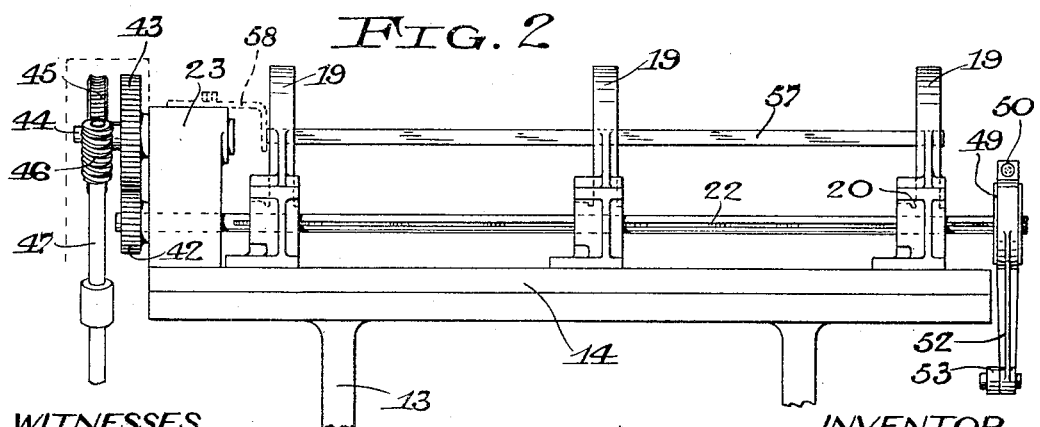
Fig. 2 is a detail front elevation of the chuck-equipped work carriage.

In the case of a long slender work-piece 57, as seen in Fig. 2, the chucks 19 may be so disposed as to engage both the ends and also the intermediate portion of the work piece, while for a shorter work piece end chucks will be found sufficient. The work piece may engage a stop 58 at one end to effect positioning.

In operation, as the work carriage is rocked forward towards the cutter head the worm 46 is swung into mesh with the worm wheel 45, thereby effecting the rotation of the shaft 22 through the intermediate gears 42, 43, the rotation of the shaft 22 being in a clockwise direction, when viewed in Figs. 1 and 3. The ring gear 24 of each chuck is thereupon rotated in a counterclockwise direction, when viewed in the same figures, and at a slow speed of rotation. The chuck members or dies 32 then engage the flat faces of the work piece to effect its rotation, the driving torque causing the work piece to bear also against the faces or jaws 41 of the friction-retarded chuck member or die 35 and thus effecting the rotation of the latter chuck member through the work piece. During this rotation the work piece is engaged and centered by the chuck members in the manner shown in Fig. 3, the rotation being in a counterclockwise direction. The work piece then is rotated slightly more than one revolution while in engagement with the cutter head.

During the rotation of the shaft 22 the brake shoes 50 and 51 are constrained against rotation by abutment of the stop 54 on the brake arm rod 53 with the fixed lug 56. When the cutting operation is complete, the work carriage is retracted by the handle 17, during which movement the worm 46 is swung out of driving engagement with the worm wheel by means of the cam and lever mechanism 48. As soon as this driving engagement is released the shaft 22 is then placed under the control of the brake shoes 50 and 51, which are in engagement with the brake drum 49 secured to the shaft. As the carriage then continues in its backward movement, the brake assembly comprising the shoes 50 and 51 is caused to rotate about the lower arm 52 held stationary by the rod 53, the stop 54 of which engages the stationary lug 56. The rocking movement of the brake about its pivotal connection with the rod 53 causes the rotation of the shaft 22 in a direction opposite to that of its normal or driving rotation. This reverse rotation of the shaft 22 effects the simultaneous reverse rotation of the ring gears 24 of each chuck, thus rotating the attached chuck members 32 backwardly with respect to the chuck members 35 which latter are at this time held against rotation by the frictional engagement of the friction or brake disks 29 with the friction facings 28. The chuck members or dies 32 and 35 then occupy the relative positions seen in Fig. 5, which enlarges the effective aperture occupied by the work piece and permits the work piece to be readily withdrawn in a longitudinal direction. The chuck members or dies each have their apertures suitably rounded in order to prevent damage to the work piece on insertion or withdrawal. After the finished work piece is removed from the chucks, a new work piece may be readily inserted and the turning operation repeated.

The chucking means of this invention permits the chucking and releasing of the work in a very rapid and expeditious manner and makes it possible to substantially increase the output of a turning machine. The chucking and driving of the work piece at more than one point greatly reduces the torsional strain on the work piece during the cutting operation and minimizes the danger of splintering and cracking. In addition, the chucks of this invention afford accurate centering of the work piece, thereby permitting working to close limits and minimizing waste.

What I claim as new and desire to secure by Letters Patent is:

1. A chuck comprising a pair of relatively rotatable chuck members having registering apertures provided with oppositely-directed work-engaging abutments movable in opposite directions to chucking and releasing positions, means for driving one of said chuck members in work-chucking direction, means for retarding the rotation of the other of said chuck members during rotation of said driven chuck member, and means for rotating said first-named chuck member in a direction opposite to driving for effecting release of the work from chucking engagement.

2. A chuck comprising a pair of relatively rotatable chuck members having registering axial apertures to receive a polygonal work piece therein, one of said chuck members having work-driving abutments engageable with the side faces of the work piece adjacent the corners thereof and the other of said chuck members having complementary work-engaging abutments engageable with the faces of the work piece at opposite sides of the corners thereof with respect to the faces engaged by said first-named chuck member, means for rotating said first-named chuck member in work-chucking direction, means for retarding the rotation of said second-named chuck member, and means for rotating said first-named chuck member in an opposite direction to effect the release of the work piece from chucking engagement.

3. A chuck comprising a pair of relatively rotatable chuck members having registering axial openings to receive a polygonal work piece therein and including relatively rotatable chucking abutments engageable with the faces of the work piece adjacent the corners thereof, a ring gear secured to one of said chuck members and rotatable alternatively in opposite directions, and means for retarding rotation of the other of said chuck members to permit work-chucking in one direction of rotation of said first-named chuck member and to permit work releasing in the opposite direction of rotation.

4. A chuck comprising a housing, a pair of chuck members rotatably mounted thereon and having registering axial openings for receiving a polygonal work piece therethrough, said chuck members having complementary abutments engageable with the corners of the work piece for effecting chucking when said chuck members are rotated relatively in one direction and work-releasing when rotated relatively in the opposite direction, and friction means retarding the rotation of one of said chuck members.

5. A chuck comprising a pair of relatively rotatable chuck members having registering apertures to receive a work piece therein, said chuck members having complementary work-engaging abutments movable into chucking engagement with the work piece when said chuck members are rotated relatively in one direction, means for rotating one of said chuck members in work-chucking direction, means for retarding the rotation of the other of the chuck members, and friction driving means for rotating said first-named chuck member in a direction opposite to driving to effect the release of the work piece from chucking engagement.

6. A chuck comprising a pair of relatively rotatable chuck members having registering work-receiving apertures and including work-engaging abutments movable into chucking engagement with the work when said chuck members are rotated relatively in one direction, and movable to work-releasing position when said chuck members are rotated relatively in the opposite direction, means for driving one of said chuck members in work-chucking direction, means for retarding the rotation of the other of said chuck members, and means for relatively rotating said chuck members in an opposite direction to effect release of the work from chucking engagement.

7. A chuck comprising a pair of relatively rotatable chuck members for receiving a work piece therein and including work-engaging abutments circumferentially movable into chucking engagement with the work piece when said chuck members are rotated relatively in one direction and circumferentially movable to work-releasing position when said chuck members are rotated relatively in the opposite direction, means for retarding the rotation of one of said chuck members, and means for driving the other of said chuck members, whereby the driving torque will retain said work-engaging abutments in chucking engagement with the work piece.

8. A chuck comprising a pair of relatively rotatable chuck members receiving a work piece therein and including work-engaging abutments angularly displaceable on the relative rotation of said chuck members to form work-receiving jaws between them, said abutments being movable into work-chucking position when said chuck members are rotated relatively in one direction and movable apart to work-releasing position when said chuck members are relatively rotated in the opposite direction, and means for retarding the rotation of one of said chuck members to permit the initial rotation of the other chuck member on its chucking movement.

9. The combination of a support, a pair of relatively rotatable chuck members mounted on said support to receive a work piece therein and having work-engaging abutments movable into chucking engagement with the work piece when said chuck members are rotated relatively in one direction, a rotatable member having a driving connection with one of said chuck members for rotating said chuck member in work-chucking direction, means for retarding the rotation of the other of the chuck members, and frictional driving means acting on said rotatable member for driving said first-named chuck member in a direction opposite to driving to effect the release of the work piece from driving engagement.

10. The combination of a reciprocatory support, a pair of relatively rotatable chuck members mounted on said support for receiving a work piece therein and including work-engaging abutments movable into chucking engagement with the work piece when said chuck members are rotated relatively in one direction and movable to work-releasing position when said chuck members are rotated relatively in the opposite direction, means for driving one of said chuck members in work-chucking direction, means for retarding the rotation of the other of said chuck members, and means operated by the movement of said reciprocatory support for relatively rotating said chuck members in a work-releasing direction.

11. A chuck comprising, in combination, a narrow frame having an opening therethrough, a web on said frame extending into said opening, a first apertured disk positioned on one side of said web, an anti-friction bearing interposed between said web and said first disk and rotatably supporting said disk on said web, a second apertured disk positioned coaxially with said first disk and rotatably supported thereby with its edges extending along said web on the opposite side from said first disk, friction means carried by said web between said web and said second disk to retard rotative movement of said second disk, and work clamping means operated by relative rotative movement of said disks.

12. A chuck comprising, in combination, a narrow annular frame having an opening therethrough, a web on said frame extending into said opening and having an annular flange extending laterally therefrom, a first apertured disk having a laterally opening annular channel formed therein, said disk being positioned within the opening in said frame with said flange in said channel, an anti-friction radial bearing interposed between said flange and one side of said channel to facilitate rotation of said disk relative to said frame, a second apertured disk rotatably supported parallel to and in close lateral relation to said first disk, and means operable by relative rotative movement of said disks to clamp a work piece extending through the apertures in said disks, said means being positioned entirely within said apertures.

13. A chuck comprising, in combination, a narrow annular support, an internal annular web on said support having a flange extending laterally therefrom, a first apertured disk having a laterally opening annular channel formed therein, said disk being positioned within the opening in said support with said flange in said channel, an anti-friction bearing interposed between said flange and one side of said channel to facilitate rotation of said disk relative to said support and serving to prevent lateral displacement of said disk, a second apertured disk rotatably supported parallel to and in close lateral relation to said first disk, and means carried by said disks within the apertures in the disks and operable by relative rotative movement of said disks to clamp a work piece extending through said apertures.

14. A chuck comprising, in combination, a narrow annular housing, a pair of relatively thin centrally apertured disks positioned in close lateral relation to each other and contained within said housing, supporting means extending from said housing radially inwardly between said disks arranged to rotatably support said disks within the housing, and work engaging means positioned within the apertures in said disks and operable to clamp a work piece by relative rotational movement of the disks.

15. A chuck comprising, in combination, a thin frame having an opening therethrough, a first apertured disk positioned within said opening, an anti-friction bearing rotatably supporting said disk within said opening and arranged to prevent lateral displacement of said disk, a second disk supported on said first disk for rotational movement relatively thereto and having an aperture formed therein substantially in registry with the aperture in said first disk, and cooperating means carried by said disks operable by relative rotative movement of said disks to clamp a work piece extending through said aperture.

16. A chuck comprising, in combination, a pair of disks having central apertures formed therein, means rotatably supporting one of said disks, a jaw member removably secured in the aperture in said supported disk and having a bearing portion projecting laterally from one side thereof and entering the aperture in said second disk to support said disk, means arranged to maintain said disk in position on said bearing portion, and a second jaw member removably secured in the aperture in said second disk.

17. In a chuck for supporting work pieces of angular cross section, a pair of parallel relatively rotatable disks, each disk having a central aperture formed therein, a plurality of abutments on each of said disks, one on each disk for each side of the work piece to be centered and supported, said abutments on the two disks being oppositely disposed and movable by relative rotative movement of said disks into abutting relation with the side edges of the work piece adjacent a corner thereof.

18. A chuck comprising a pair of relative rotatable members having registering axial openings therein, and work clamping means comprising a plurality of abutments carried by and rigid with one disk within said aperture, and a plurality of circumferentially opposed abutments carried by and rigid with the other of said disks within its aperture.

19. A work centering and supporting device for a lathe, comprising, in combination, a frame, an apertured member rotatably supported in said frame, and means on said member extending into said aperture providing a plurality of similarly disposed angularly displaced abutments arranged to engage portions of the sides of a polygonal work piece when such a work piece is in a definite rotative position relatively to said member, the means forming said abutments being arranged to permit rotative movement of such a work piece in one direction away from said abutments to facilitate removal of the work piece longitudinally from said aperture.

20. A work centering and supporting device for a lathe, comprising, in combination, a frame, an apertured member rotatably supported in said frame, means on said member extending into said aperture providing a plurality of similarly disposed angularly displaced abutments arranged to engage portions of the sides of a polygonal work piece, the means forming said abutments being arranged to permit rotative movement of such a work piece in one direction away from said abutments, and means operable to rotate a work piece relatively to said member and into engagement with said abutments.

21. A device for centering and supporting a work piece for rotation about a longitudinal axis, said device comprising, in combination, a plurality of pairs of relatively movable abutments disposed in angularly spaced relation about said axis, the two abutments of each pair being positioned at points spaced longitudinally of said axis and each pair being arranged to engage the two sides of a work piece adjacent a corner.

22. A device for centering and supporting a work piece of polygonal cross section for rotation about a given longitudinal axis, said device comprising a plate adapted to be supported for rotation about an axis perpendicular to said plate and having an aperture formed therein, said aperture having a plurality of arm-like portions extending outwardly from said axis and spaced angularly with respect to each other, said portions being offset laterally with respect to radii extending parallel to said portions.

23. A device for centering and supporting a work piece of polygonal cross section for rotation about a given longitudinal axis, said device comprising a disk adapted to be supported for rotational movement about an axis perpendicular to said disk, said disk having a central aperture formed therein, said aperture having a plurality of extending portions of less width than the side of the work piece to be supported.

24. A chuck for centering and clamping a square work piece for rotation about a given longitudinal axis, said chuck comprising a pair of disks supported in close lateral relation for rotative movement about an axis perpendicular to the disks, said disks having apertures formed therein of cruciform shape with the arms laterally offset to form work engaging faces, the apertures in the two disks being reversely positioned.

In testimony whereof I affix my signature.
JAIRUS S. RICHARDSON.